US010996016B1

(12) United States Patent
Jarvis et al.

(10) Patent No.: US 10,996,016 B1
(45) Date of Patent: May 4, 2021

(54) LOAD DISTRIBUTION NUT

(71) Applicant: U.S. Government as Represented by the Secretary of the Army, Dover, NJ (US)

(72) Inventors: Adam Jarvis, Blairstown, NJ (US); Joseph Troll, West Milford, NJ (US); Matthew Jones, Stanhope, NJ (US); Luke Helsel, Rockaway, NJ (US)

(73) Assignee: U.S. Government as Represented by the Secretary of the Army, Washington, DC (US)

( * ) Notice: Subject to any disclaimer, the term of this patent is extended or adjusted under 35 U.S.C. 154(b) by 89 days.

(21) Appl. No.: 16/548,005

(22) Filed: Aug. 22, 2019

(51) Int. Cl.
| | |
|---|---|
| *F15B 15/22* | (2006.01) |
| *F41A 21/36* | (2006.01) |
| *F16J 10/04* | (2006.01) |
| *F16J 10/02* | (2006.01) |
| *F15B 15/14* | (2006.01) |
| *F16J 1/12* | (2006.01) |

(52) U.S. Cl.
CPC .......... *F41A 21/36* (2013.01); *F15B 15/224* (2013.01); *F16J 10/04* (2013.01); *F15B 15/1428* (2013.01); *F16J 1/12* (2013.01); *F16J 10/02* (2013.01)

(58) Field of Classification Search
CPC  F15B 15/1438; F15B 15/1442; F15B 15/224; F16J 10/04; F41A 21/36
See application file for complete search history.

(56) References Cited

U.S. PATENT DOCUMENTS

| | | | | |
|---|---|---|---|---|
| 2,810,370 | A | * | 10/1957 | Fox ........................ F15B 15/224 91/25 |
| 4,056,040 | A | * | 11/1977 | Fussangel ............. F15B 15/224 91/25 |
| 4,089,251 | A | * | 5/1978 | Louviot ................. F15B 15/224 91/26 |
| 4,151,784 | A | * | 5/1979 | Fussangel ............... F16F 9/346 188/285 |
| 4,257,499 | A | * | 3/1981 | Deschner ............... F15B 15/224 188/287 |
| 9,879,701 | B2 | * | 1/2018 | Green ...................... F16F 9/063 |
| 2020/0191174 | A1 | * | 6/2020 | Tam ....................... F15B 11/123 |

FOREIGN PATENT DOCUMENTS

FR            1280935 A  *  1/1962  .......... F15B 15/1438

* cited by examiner

*Primary Examiner* — Michael Leslie
(74) *Attorney, Agent, or Firm* — John P. DiScala

(57) ABSTRACT

A hydraulic cylinder with a load distribution nut connected to an end cap reduces fatigue experience by the end cap portion of the cylinder. The load distribution nut separates the axial load generated in the system from a single to multiple load paths. By introducing additional load paths, the load experienced by the traditional load path is reduced. Additionally, the load experienced by the end cap can be tailored by modifying the design of the load distribution nut and end cap. By either increasing or decreasing the surface area of the load distribution nut the axial load reduction on the end cap is correspondingly decreased or increased.

12 Claims, 3 Drawing Sheets

Prior Art FIG. 1

LOAD DISTRIBUTION NUT

STATEMENT OF GOVERNMENT INTEREST

The inventions described herein may be manufactured, used and licensed by or for the United States Government.

FIELD OF THE INVENTION

The invention relates in general to hydraulic devices and in particular to hydraulic cylinders.

BACKGROUND OF THE INVENTION

Hydraulic cylinders come in many shapes and sizes and serve in functions ranging from attenuating recoil to lifting enormous loads. These systems, generally, have the following key components: a piston, a high pressure vessel, a low pressure reservoir, a working fluid and either a throttling device or pump. The high pressure vessel is generally cylindrical in shape with the piston translating axially along the vessel.

In operation, whether the fluid is performing work or being throttled, a shaft attached to the piston is either pushed on by high pressure or creates high pressure by pushing on the working fluid. This generates axial forces on both the piston and the high pressure vessel. Most traditional systems are sealed with an end cap which threads directly onto the high pressure vessel housing. Seals are used between the cap and the casing to ensure that there is no fluid leakage.

Prior Art FIG. 1 shows a specific variety of this traditional end cap. The end cap seals both an inner and outer annulus for recoil attenuation system which employs a pepper pot for fluid throttling. Using this traditional end cap retention method, one hundred percent of the axial load generated by the piston and fluid is transferred into the casing through the end cap threads. Depending on the magnitude of the load, the casing region may experience reduced functional lifespan due to fatigue.

Accordingly, a need exists for a hydraulic cylinder with an improved end cap to mitigate fatigue issues without adding undue weight to the cylinder.

SUMMARY OF INVENTION

One aspect of the invention is a hydraulic cylinder. The hydraulic cylinder includes a casing, a pepper pot, an end cap, a load distribution nut, a high pressure seal, a working fluid and a piston. The casing serves as an external housing. The pepper pot is coaxial with and surrounded by the casing. The pepper pot further comprises one or more orifices which allow a working fluid to flow through the pepper pot. The end cap is fixed to and encloses the casing. The end cap further comprises a protrusion extending into the interior cavity of the pepper pot. The load distribution nut is positioned between the protrusion of the end cap and the pepper pot. The load distribution nut is fixed to and enclosing the pepper pot. The high pressure seal is positioned between the load distribution nut and the end cap. The piston is positioned within and translates axially along the pepper pot thereby pressurizing the working fluid within the pepper pot and directing an axial force toward the end cap and the load distribution nut. The end cap transmits a first portion of the axial force to the casing. The load distribution nut transmits a remaining portion of the axial force to the pepper pot.

Another aspect of the invention is a hydraulic cylinder for a cannon recoil mitigation system. The hydraulic cylinder includes a casing, a pepper pot, an end cap, an annular load distribution nut, a non-metallic static seal and a piston. The casing further comprising a mount located along an exterior circumferential surface for mounting the casing to a cannon platform. The pepper pot is coaxial with and surrounded by the casing and further comprises one or more orifices allowing a working fluid to flow through the pepper pot. An end cap is fixed to and encloses the casing via a first threaded interface. The end cap further comprises a cylindrical protrusion extending into an interior cavity of the pepper pot. The annular load distribution nut is positioned between the cylindrical protrusion of the end cap and the pepper pot. The annular load distribution nut has an inner diameter substantially the same as a diameter of the cylindrical protrusion and an outer diameter substantially the same as a diameter of the pepper pot. The annular load distribution nut is fixed to and encloses the pepper pot via a second threaded interface. The non-metallic static seal is located in a groove defined by a circumferential surface of the cylindrical protrusion. The non-metallic static seal is positioned between the annular load distribution nut and the cylindrical protrusion. The piston is positioned within and configured for translating axially along the pepper pot upon a cannon firing event thereby pressurizing the working fluid within the pepper pot and directing an axial force in a direction normal to a top surface of the cylindrical protrusion and a top surface of the annular load distribution nut. The end cap transmits a first portion of the axial force to the casing and the annular load distribution nut transmits a remaining portion of the axial force to the pepper pot.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

Prior Art

DETAILED DESCRIPTION

A hydraulic cylinder with a load distribution nut connected to an end cap reduces fatigue experience by the end cap portion of the cylinder. The load distribution nut separates the axial load generated in the system from a single to multiple load paths. By introducing additional load paths, the load experienced by the traditional load path is reduced. Additionally, the load experienced by the end cap can be tailored by modifying the design of the load distribution nut and end cap. By either increasing or decreasing the surface area of the load distribution nut the axial load reduction on the end cap is correspondingly decreased or increased.

Figure 1:
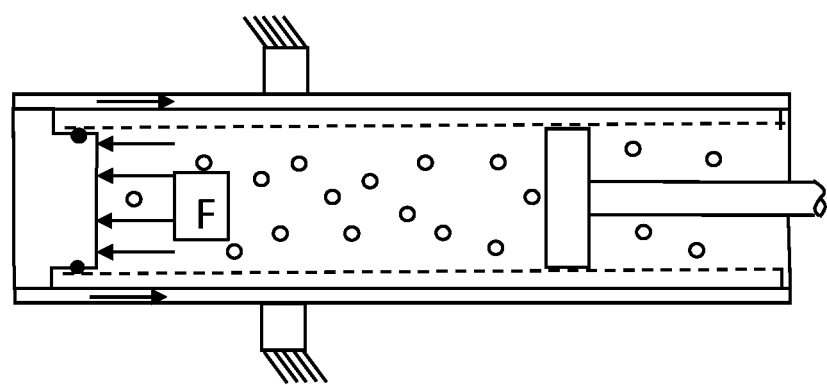
FIG. 1 is a cross-sectional view of a hydraulic cylinder with a traditional end cap.
Figure 2:
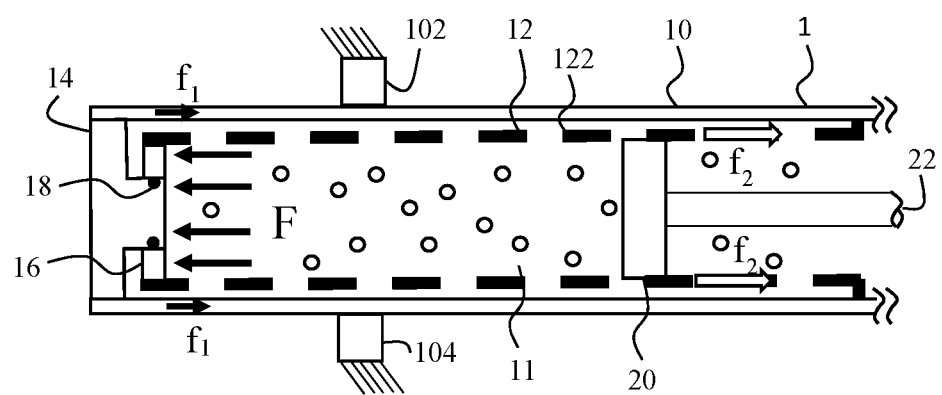
FIG. 2 is a cross-sectional view of a hydraulic cylinder with a load distribution nut, according to an illustrative embodiment.
Figure 3:
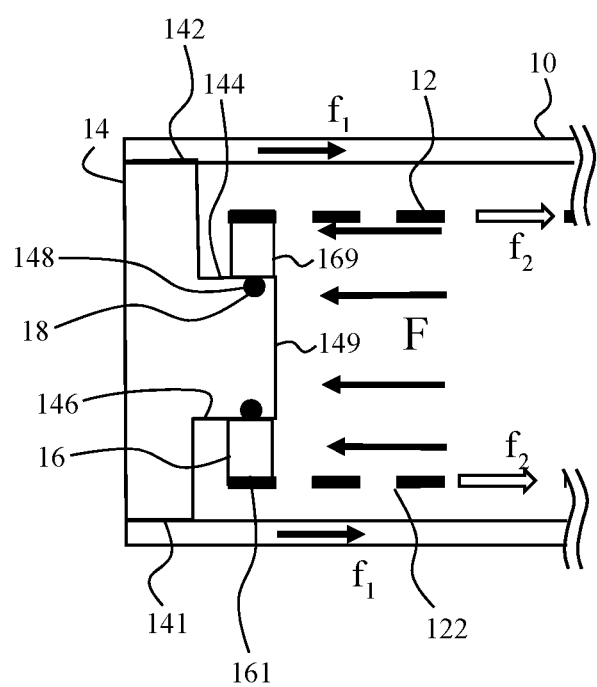
FIG. 3 is a close-up cross-sectional view of an end cap and load distribution nut, according to an illustrative embodiment.

FIG. 2 is a cross-sectional view of a hydraulic cylinder with a load distribution nut, according to an illustrative embodiment. FIG. 3 is a close-up cross-sectional view of an end cap and load distribution nut, according to an illustrative embodiment. The hydraulic cylinder 1 shown and described is employed in a recoil mitigation system, such as those employed in an artillery weapon system. As an artillery cannon recoils in response to a firing event, the cannon's energy is absorbed and dissipated by hydraulic damping.

The hydraulic cylinder 1, however, may be employed in a variety of applications requiring hydraulic cylinders and not just recoil mitigation systems. The hydraulic cylinder 1 may be employed in other force absorbing or mitigation systems. Further, the hydraulic cylinder 1 may be employed in systems in which the piston is performing work, such as in a linear actuator or similar system.

The hydraulic cylinder 1 comprises a casing 10, a pepper pot 12, an end cap 14, a load distribution nut 16, a high pressure seal 18, a working fluid 11, a piston 20 and a piston shaft 22. The casing 10 is generally cylindrical in shape and its hollow center defines an interior cavity. The casing 10 serves as the housing for the hydraulic cylinder 1. A working fluid 11, such as a hydraulic fluid is contained within the casing 10.

The casing 10 is mounted to a platform, in this instance, the artillery weapon system, at a point along its length by a first mount 102 and a second mount 104. Critically, the hydraulic cylinder 1 is not mounted at the end cap or head cap, as is common with many hydraulic cylinders. As such, the end cap 14 does not support any of the internally generated forces but rather those forces are transferred to the casing 10.

Further, in certain applications, such as an artillery cannon recoil system, it is desirable to minimize the weight of the hydraulic cylinder 1. Accordingly, in this embodiment, the casing 10 is made from a relatively light weight material, such as aluminum. However, the stresses which the casing 10 can handle are less than in a traditional cylinder in which a heavier casing, either due to material choice or thickness, may be employed.

The pepper pot 12 is a hollow cylinder located within and coaxial with the casing 10. The pepper pot 12 extends substantially the same length as the casing 10. The pepper pot 12 further comprises orifices 122 defined by the cylindrical wall of the pepper pot 12 and extending from an interior surface of the cylindrical wall to an exterior surface of the cylindrical wall. As will be described further below, the orifices 122 serve to throttle the working fluid 11 during operation. In one embodiment, the pepper pot 12 is formed from a steel material due to the high stresses experienced during fluid throttling.

A cylindrical end cap 14 connects to the base of the casing 10 thereby sealing and enclosing the casing 10. The end cap 14 is received within and fixed to the interior surface of the casing 10, such as by a threaded interface 141 between the two surfaces. The end cap 14 has a generally cylindrical shaped body 142 with a cylindrical protrusion 144 having a stepped down diameter extending from the body 142. A circumferential surface 146 of the cylindrical protrusion 144 defines a groove 148 for capturing a non-metallic seal 18.

The protrusion 144 of the end cap 14 extends into the interior volume of the pepper pot 12. A load distribution nut 16 is an annular cylinder and surrounds the cylindrical protrusion 144 such that it is positioned between the protrusion 144 and the pepper pot 12. The load distribution nut 16 is connected to the pepper pot 12 at the base of the pepper pot 12 by a threaded interface 161. Together, the load distribution nut 16 and the protrusion 144 form a base enclosing the pepper pot 12.

The high pressure non-metallic seal 18 is positioned between the load distribution nut 16 and the end cap 14. In one embodiment, the seal 18 is captured in a groove 148 in the protrusion 144 of the end cap 14. The high pressure seal 18 seals the base of the pepper pot 12 and creates a relatively low friction contact between the load distribution nut 16 and the end cap 14. The end cap 14 and the pepper pot 12 may move relative to each other.

A piston 20 connected to a piston shaft 22 is located within and translates axially within the pepper pot 12. Prior to operation, the piston 20 is located at the top of the pepper pot 12 near a cylinder head of the casing 10.

In operation, the piston shaft 22 in response to a recoiling cannon, causes the piston 20 to translate axially within the pepper pot 12. As the piston 20 travels toward the base of the pepper pot 12, the volume of the high pressure vessel defined by the pepper pot 12 is reduced and the working fluid 11 is throttled through the orifices 122 of the pepper pot 12. In addition, as the piston 20 travels toward the base, the number of orifices 122 from which the fluid may exit the pepper pot 12 is also reduced. This highly pressurizes the pepper pot 12 and the fluid pressure generates an axial force, represented by the arrows labeled F, in the direction of the base of the hydraulic cylinder 1.

In legacy systems, the entirety of this force (F) was transferred into the casing through the casing. However, in the present hydraulic cylinder 1, the load distribution nut 16 redirects a portion of that force, represented by the arrows labeled f2, through the load distribution nut 16 to the pepper pot 12. That is to say, the axial load produced by the fluid pressure is divided into two components, one portion of which, represented by the arrows labeled f1, is directed to the casing 10 through the end cap 14 and the remaining portion t2 which is directed to the pepper pot 12 through the load distribution nut 16.

Advantageously, the distribution of forces between the pepper pot 12 and the casing 10 may be tailored to the desired ratio by adjusting the diameters of the cylindrical protrusion 144 and the load distribution nut 16. The ratio of the surface area of the top surface 169 of the load distribution nut 16, the surface which is normal to the axial force, and the surface area of the top surface 149 of the end cap protrusion 144, also normal to the axial force, determines the magnitude of the two components of the force f1, f2.

While the invention has been described with reference to certain embodiments, numerous changes, alterations and modifications to the described embodiments are possible without departing from the spirit and scope of the invention as defined in the appended claims, and equivalents thereof.

What is claimed is:

1. A hydraulic cylinder comprising:
a casing;
a pepper pot coaxial with and surrounded by the casing and further comprising one or more orifices allowing a working fluid to flow through the pepper pot;
an end cap fixed to and enclosing the casing, the end cap further comprising a protrusion extending into an interior cavity of the pepper pot;
a load distribution nut positioned between the protrusion of the end cap and the pepper pot, said load distribution nut fixed to and enclosing the pepper pot;
a high pressure seal positioned between the load distribution nut and the end cap;
a piston positioned within and configured for translating axially along the pepper pot thereby pressurizing the working fluid within the pepper pot and directing an axial force toward the end cap and the load distribution nut; and wherein the end cap transmits a first portion of the axial force to the casing and the load distribution nut transmits a remaining portion of the axial force to the pepper pot.

2. The hydraulic cylinder of claim 1 wherein the protrusion of the end cap and the load distribution nut each have a top surface which is normal to the axial force and the ratio of the first portion of the axial force to the remaining portion of the axial force is proportional to a ratio of a surface area of the top surface of the protrusion to a surface are of the top surface of the load distribution nut.

3. The hydraulic cylinder of claim 2 wherein the protrusion of the end cap is cylindrical.

4. The hydraulic cylinder of claim 3 wherein the end cap further comprises a groove defined by a circumferential surface of the protrusion for capturing the seal.

5. The hydraulic cylinder of claim 3 wherein the load distribution nut is an annular cylinder.

6. The hydraulic cylinder of claim 1 wherein the pepper pot is made from a steel material.

7. The hydraulic cylinder of claim 1 wherein the casing is made from an aluminum material.

8. The hydraulic cylinder of claim 1 wherein the end is connected to the casing via a threaded interface.

9. The hydraulic cylinder of claim 1 wherein the load distribution nut is connected to the pepper pot via a threaded interface.

10. The hydraulic cylinder of claim 1 wherein the hydraulic cylinder further comprises a mount positioned along the casing for mounting the hydraulic cylinder to a platform.

11. A hydraulic cylinder for a cannon recoil mitigation system comprising:
   a casing further comprising a mount located along an exterior circumferential surface for mounting the casing to a cannon platform;
   a pepper pot coaxial with and surrounded by the casing and further comprising one or more orifices allowing a working fluid to flow through the pepper pot;
   an end cap fixed to and enclosing the casing via a first threaded interface, the end cap further comprising a cylindrical protrusion extending into an interior cavity of the pepper pot;
   an annular load distribution nut positioned between the cylindrical protrusion of the end cap and the pepper pot and having an inner diameter substantially the same as a diameter of the cylindrical protrusion and an outer diameter substantially the same as a diameter of the pepper pot, said annular-load distribution nut fixed to and enclosing the pepper pot via a second threaded interface;
   a non-metallic static seal located in a groove defined by a circumferential surface of the cylindrical protrusion, said non-metallic static seal positioned between the annular load distribution nut and the cylindrical protrusion;
   a piston positioned within and configured for translating axially along the pepper pot upon a cannon firing event thereby pressurizing the working fluid within the pepper pot and directing an axial force in a direction normal to a top surface of the cylindrical protrusion and a top surface of the annular load distribution nut; and
   wherein the end cap transmits a first portion of the axial force to the casing and the annular load distribution nut transmits a remaining portion of the axial force to the pepper pot.

12. The hydraulic cylinder of claim 11 wherein a ratio of the first portion of the axial force to the remaining portion of the axial force is proportional to a ratio of a surface area of the top surface of the cylindrical protrusion to a surface are of the top surface of the load distribution nut.

* * * * *